Aug. 13, 1940.  R. N. ISBELL  2,211,376
VIEWING APPARATUS
Original Filed Feb. 8, 1938   3 Sheets-Sheet 1
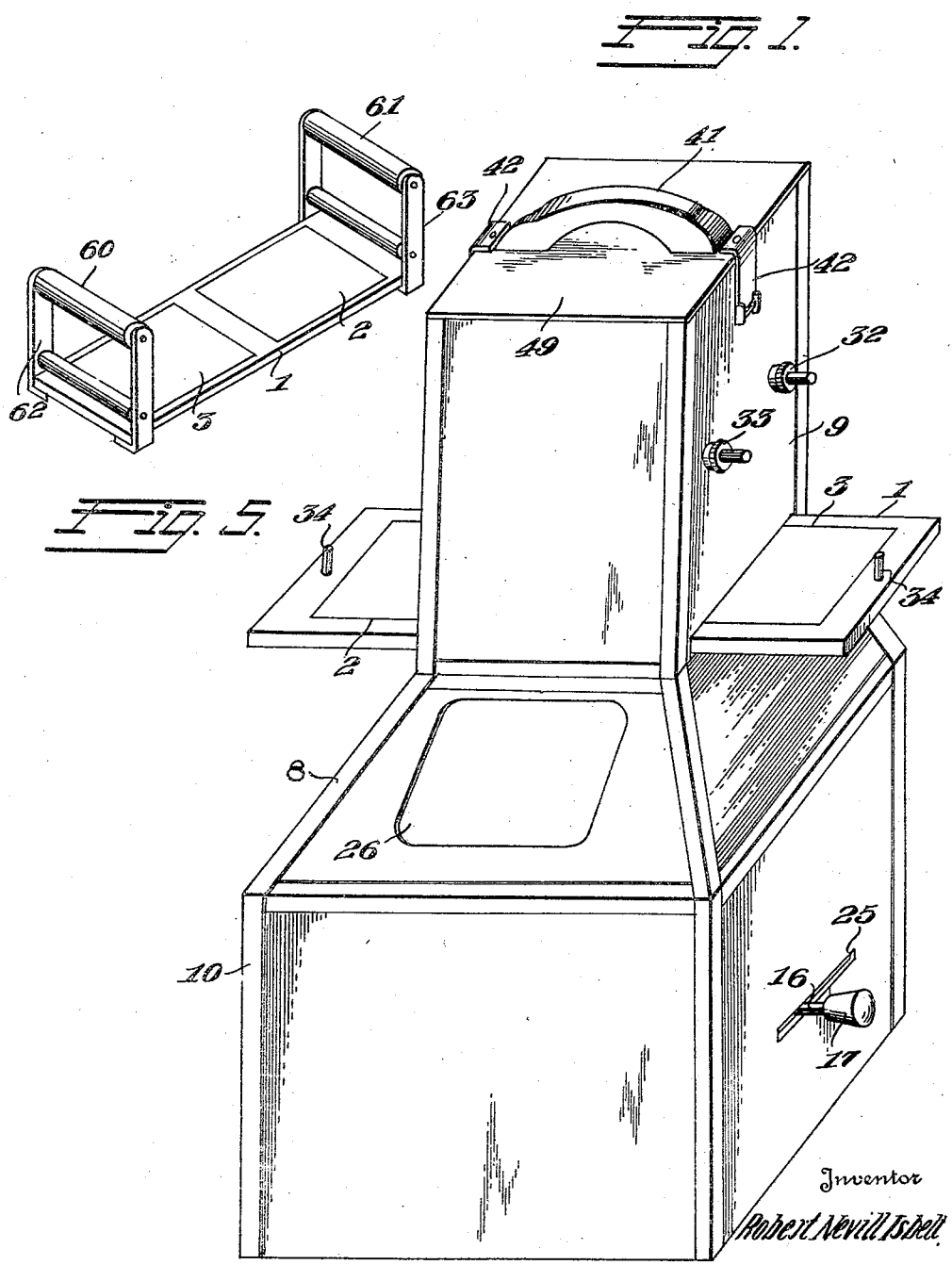
Inventor
Robert Nevill Isbell
By William C. Linton
Attorney

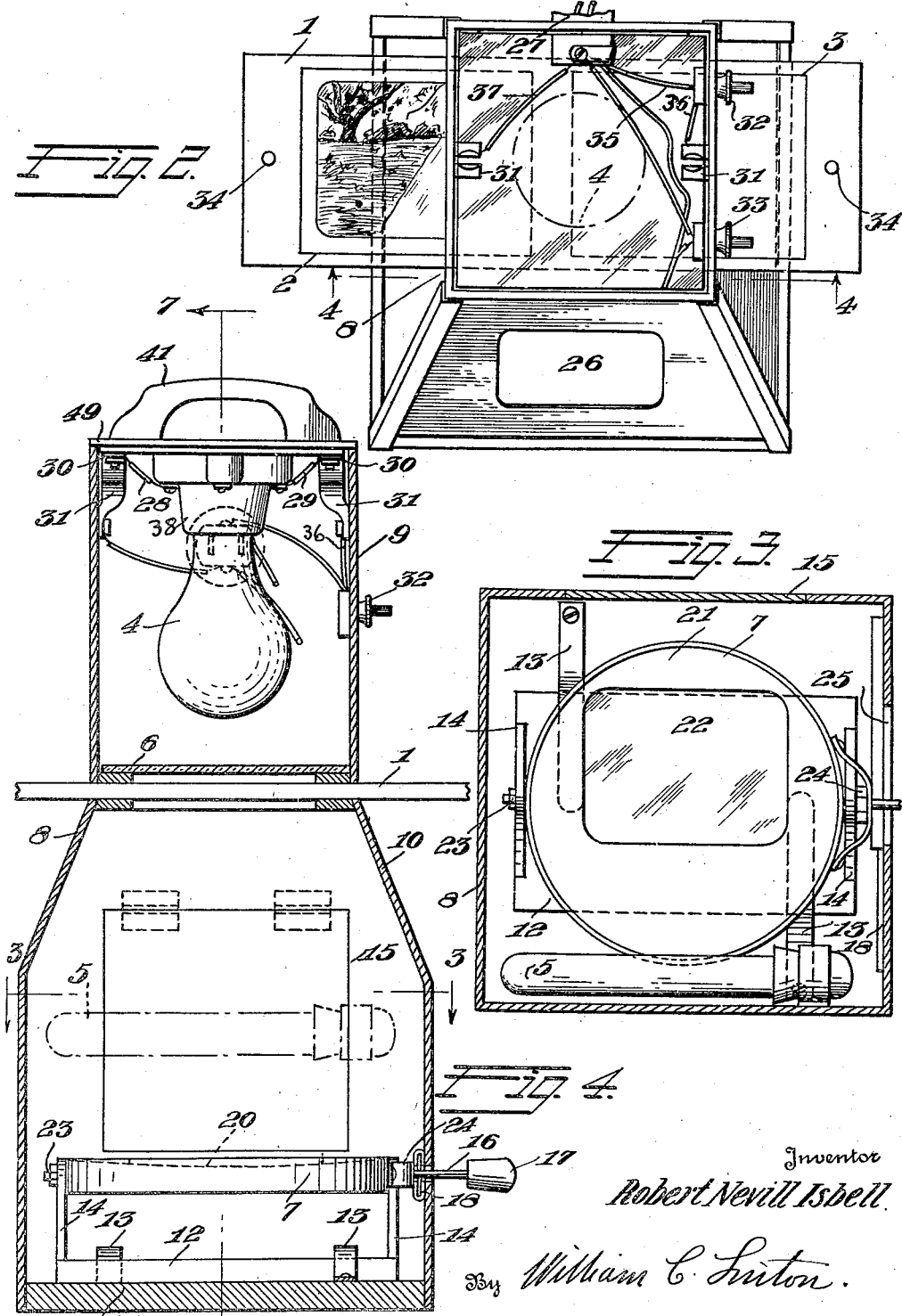

Aug. 13, 1940. R. N. ISBELL 2,211,376
VIEWING APPARATUS
Original Filed Feb. 8, 1938   3 Sheets-Sheet 3
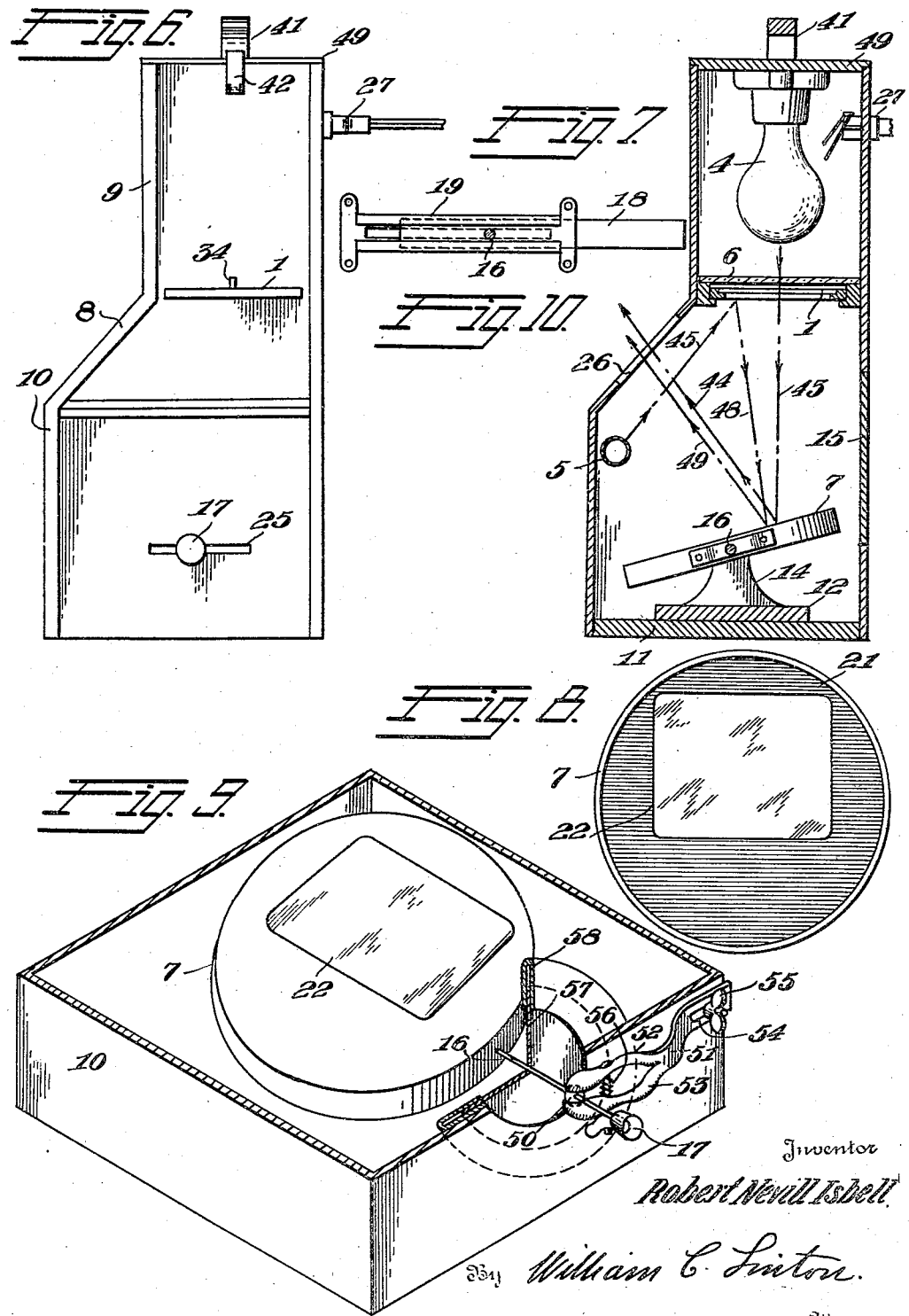
Inventor
Robert Nevill Isbell
By William C. Linton
Attorney Patented Aug. 13, 1940

2,211,376

UNITED STATES PATENT OFFICE 2,211,376

VIEWING APPARATUS

Robert Nevill Isbell, Wake Forest, N. C.

Application February 8, 1938, Serial No. 189,425
Renewed January 9, 1940

6 Claims. (Cl. 88—24)

My invention relates to a universally applicable viewing apparatus for viewing at will either transparent prints, such as photographic reproductions on glass, or opaque prints, such as photographic prints on paper, or post cards, and at the same time substantially magnifying such prints and intensely illuminating the same.

Heretofore, there have been known certain devices for viewing transparent prints, and certain other devices for viewing opaque prints. With such devices, on the frequent occasions when it is desired to successively view transparent prints and opaque prints, it is necessary for the observer to employ two separate devices and to walk from one device to the other.

My invention obviates this and other inconvenience inherent in devices of this type heretofore available, by providing a single unit wherein either a transparent print or an opaque print may be satisfactorily viewed in immediate succession by an instantaneous adjustment of a selective control.

An object of my invention is to provide a simple, rugged, portable device for viewing prints.

Another object is to provide means for magnifying a print which is being viewed and means to adjustably position the magnifying means to obtain optimum effect.

A further object of my invention is to provide adjustable means for selectively bringing into operative position either a transparent print or an opaque print.

A still further object of my invention is to provide a plurality of light sources selectively actuatable and positioned to most advantageously illuminate the type of print being viewed.

Yet another object of my invention is to provide a casing surrounding the viewing means and universally adjustable and light-shielding means extending through the device for orienting the mirror.

Still a further object of my invention is to provide a device which is simple and rugged in construction and reliable in performance and which may be manufactured in large quantities at low cost.

Other objects of the invention will be in part obvious and in part pointed out hereinafter.

In order that the invention and its mode of operation may be readily understood by persons skilled in the art, I have in the accompanying drawings and in the detailed following description based thereupon, set out an embodiment of the same.

In the drawings:

Figure 1 is a perspective view of the assembled apparatus showing the casing, print slide, and handle for adjusting the mirror.

Figure 2 is a top plan view with cover removed showing the upper portion of the casing with the print slide in position, the viewing aperture, upper light, and selectively actuatable switches.

Figure 3 is a sectional view of the lower part of the casing taken on line 3—3 of Figure 4 showing the mirror mounted on the sub-base and supported on the casing base, together with the lower light.

Figure 4 is a vertical sectional view taken on the line 4—4 of Figure 2 showing the cover with upper light in position, the print slide, the lower light, and the mirror with its handle mounted on the sub-base, all mounted within the casing.

Figure 5 is a detailed perspective view of the slide for supporting a transparent print and an opaque print, with its terminal stops.

Figure 6 is a side elevation of the form of device shown in Figures 1-4, as seen from the right side of Figure 4.

Figure 7 is a vertical sectional view taken on the line 7—7 of Figure 4 and perpendicular to the plane of Figure 4 showing the upper and lower lights, the print slide and ground glass, the mirror tilted toward the viewing aperture, and the path of the transmitted ray from the upper light through the print to the mirror and the reflected ray from the mirror to the observer, and also the ray from the lower source reflected by the opaque print upon the mirror and again reflected from the mirror to the observer.

Figure 8 shows a detail of the concave mirror unit, with its frame, concave mirror element, and non-light-reflecting mat for framing the portion of the mirror which it is desired to use, and Figure 9 shows as a modification of my invention an alternative form of structure for adjustably positioning and orienting the mirror unit and at the same time excluding light from entering the interior of the casing, avoiding the use of a movable sub-base.

Figure 10 is a detail in elevation of the light shield slide and slide-way positioned on the side of the casing for the passage therethrough of the displaceable mirror adjusting rod in light-excluding relation.

The device which I describe herein has been found to be very simple and effective in operation and to produce a very clear, enlarged, projected image with the effect of perspective.

Referring now more particularly to the accompanying drawings wherein like and corresponding parts are designated by similar reference characters throughout the several views, the slide 1 is provided with framing apertures 2 and 3 adapted to support either transparent or opaque prints of the size which it is desired to employ. The slide is adapted to move with sliding motion through a horizontal aperture provided therefor in the casing 8, and is provided with terminal stops 34 to prevent its movement out of the passage. Above slide 1 is mounted upper incandescent electric lamp 4 which is adapted to direct light rays downward through a print carried in slide 1. Below slide 1 is mounted a lower incandescent electric lamp 5 which is adapted to direct rays of light upwardly on the under surface of a print carried by slide 1; this light 5 should be mounted somewhat to the side of the direct ray path downwardly from upper light 4 through the slide, to avoid undesired crossing of ray paths.

Between the upper light 4 and the slide 1 is positioned a ground or opal glass 6 or other suitable light diffusing means.

Positioned in the lower part of the casing and mounted for adjustable orientation is a concave mirror 7. The concave contour of this mirror is indicated by the curved line 20. It is advantageous to have this mirror substantially spherical to produce an image of satisfactory definition. The mirror 7 is mounted within a carrying frame, here shown as circular, within which frame there is a framing mat 21 formed of heavy fibrous material of a dead dark grey color, or other non-light-reflecting material. Within this mat there is formed an aperture 22 of desired shape, here shown as rectangular, in order to frame a picture of a shape substantially corresponding to that of the print to be viewed. The mirror frame 7 is supported at diametrally opposed points by vertical arms 14 on whose upper ends are provided trunnion structures 23 and 24 wherein the mirror frame is freely rotatable about a horizontal axis. The vertical arms 14 are in turn carried on a sub-base member 12 which is conveniently a square or circular thin wooden block or plinth. The sub-base 12 rests on the base 11 of the casing 8. The casing 8 may be formed of sheet fibrous or molded material of rugged mechanical characteristics, which is opaque, and has the upper portion 9 containing upper light 4, and lower portion 10 containing lower light 5 and mirror 7. Resilient clips or fingers 13 mounted on base 11 are adapted to resiliently engage and hold sub-base 12, but not to prevent the adjustable motion of sub-base 12 when it is desired to re-position the mirror. In one side of lower portion 10 of the casing, there is provided a hinged door 15 which may be swung outwardly to inspect and adjust the elements therein.

Attached to the frame of mirror 7 at one of its points of support is rod 16. The lower part 10 of the casing is provided with a horizontal slot 25 adapted to receive the outward portion of rod 16, and a suitable handle 17 is attached to the outer end of rod 16 for convenient manual handling of the same. Carried by rod 16 just within casing 10 is a horizontal slide 18 formed of opaque material and which is adapted to slidably engage a slide-way 19 attached to the inner side of casing 10 which is in position with slot 25, the slide and slide-way being of such length that as rod 16 is moved from one end to the other of slot 25, the slide completely obstructs the passage of light through the slot.

A convenient form of casing structure is as shown in the figures, particularly in Figure 6, with an inclined central portion immediately below the slide, having on one of the inclined faces an aperture 26 of suitable size wherein the reflected image of the subject of the print may be viewed. The shape of this viewing aperture 26 is advantageously about the same as the shape of the prints to be viewed, and a convenient distance at which the observer may position his eye is about one-half an inch to one inch from the viewing aperture, which permits both eyes to see the reflected image and helps to eliminate distortion. The handle 17 may be pulled in or out, or may be displaced laterally in either direction, and the rod 16 will cause the mirror 7 to move into a desired position inside the casing by virtue of the free movement of the sub-base 12 under resilient fingers 13. In this manner, the observer can cause the ray reflected from mirror 7 to meet his eye in most advantageous manner.

On one side of the upper portion 9 of casing 8, there is provided an electric attachment receptacle 27 intended for connection in the usual manner to a commercial source of 110 volts electrical current. This receptacle has two pairs of supply leads leading respectively to the upper and lower lights, each through an individual switch. The switch 32 controls the upper light 4 and is connected by a wire 35 to one terminal of receptacle 27, and by another wire 36 to a switch point 31 of the type commonly employed on single-pole blade switches. Another supply lead 37 for upper light 4 leads from receptacle 27 to another switch point 31. The upper light 4 itself is mounted on a usual base 38 which is carried on a top closing plate 49 which closes the top of the casing, and this closing plate 49 carries complementary blade members 30 which are connected by wires 28, 29, to lamp base 38. A carrying handle 41 is provided on the top closing plate 49. The blade members 30 are adapted to engage securely the switch points 31 and to hold the closing plate 49 in tight engagement. Resilient clips 42 are provided on opposite sides of the upper part of casing 9 to additionally hold top plate 49 in position.

In Figure 9, there is shown a modified form of mounting a mirror which avoids the necessity of the sub-base 12, wherein the supporting rod 16 has greater freedom of movement in its passage through casing 10. At one point of mirror 7 is attached rod 16. The mirror is therefore carried entirely on rod 16, without support at any other point. A substantially circular aperture relatively large with reference to the diameter of rod 16 is provided in casing 10 for the passage of rod 16 therethrough. Carried on rod 16 is a substantially circular opaque shield member 57 of a diameter somewhat larger than the aperture in casing 10. Attached to the inside or outside of casing 10 is a substantially circular guideway 58 having a flanged portion relatively close to casing 10 extending inward from the circumference of the guideway, and adapted to receive shield member 57. The rod 16 may therefore be displaced horizontally or vertically or in any direction from its normal horizontal position, carrying the mirror therewith, and at all times the shield member 57 will keep completely closed the circular aperture in casing 10, so long as the displacement does not exceed the difference in the radii of the aperture and shield member 57. Proper design therefore requires that shield member 57 have a radius sufficiently great to take care of the desired degree of displacement.

In order to provide for greater freedom of movement of rod 16 and mirror 7, there is also provided a ball and socket mounting for rod 16. This comprises a ball 50 carried on rod 16, and which is engaged by the recessed terminal portions of the arms 52, 53, of forked clamp 51. The arms 52 and 53 are normally held together by spring 56. The mounting portion of forked clamp 51 is provided with a slot 54 by which it may be mounted on casing 10 by wing nut 55. By this arrangement, forked clamp 51 may be adjusted under wing nut 55 to a desired position, and the rod 16 may be swung into a desired position and held there by clamping the arms 52, 53, on ball 50, so that rod 16 may be moved inwardly or outwardly, or up and down, as well as rotated, to bring mirror 7 into the optimum position for viewing. Hence, the ball 50 may be moved in any direction, and the mirror tilted as desired. This avoids the necessity for subbase 12. I have found this modified form advantageous for certain particular purposes.

In Figure 5, there is shown a form of slide particularly adapted for viewing frames on a roll of film. The film is carried on a loading spool 60 and take-off spool 61 which are respectively rotatably supported on arms 62 and 63 mounted on the ends of slide 1. The film passes vertically from the spools to the ends of slide 1, and thence along slide 1. In this way, the film may be easily advanced to bring the desired frame into operative position.

This apparatus is adapted for viewing any type of transparent or opaque prints or other subject matter, including transparent photographic negative or positive prints or films, painted transparencies, opaque photographic prints of usual type, printed pictures, post cards, and the like. The concave mirror, particularly in its preferred form with spherical contour, gives a very satisfactory magnification, which under optimum conditions gives perspective.

In operation, the prints, transparent and opaque, are placed in print slide 1, and the desired print pushed into operative position. If the print to be viewed is transparent, the switch 32 is actuated to light up light 4, and the light ray 43 (Figure 7) passes from upper light 4 through ground glass 6 and the print carried on slide 1 along ray path 43 to become incident on the concave contour of mirror 7 and to be reflected therefrom as reflected ray 44 through viewing aperture 26. In order to get optimum definition of the reflected image to be viewed most advantageously by the observer, the position of mirror 7 is adjusted both by pushing and rotating movement of rod 16.

If the print pushed into operative position is opaque, the switch 33 is actuated to light lower light 5, from which a ray 45 incident on the print carried on slide 1 is reflected as reflected ray 48 to the concave contour surface 20 of mirror 7 from which it is reflected as reflected ray 49 through viewing aperture 26. The position of mirror 7 is also adjusted in this case in a manner similar to that just described for viewing transparent prints.

In viewing certain translucent prints, it is sometimes found advantageous to light both upper light 4 and lower light 5.

My invention as herein described may be used as a photographic printing apparatus for transferring a transparency or print to an unexposed negative suitably positioned as will be obvious to those skilled in the art.

In using the slide 1, it is often convenient to place the print to be viewed in a hinged folding print carrier provided with a central aperture through which the print is visible, and of outside dimensions to fit framing apertures 2 and 3 in slide 1. Reducing print carriers may be provided to fit in framing apertures 2 and 3 and to expose through a central aperture a print of size smaller than those for which apertures 2 and 3 are designed. The folding type of carrier just mentioned may be employed for such reducing.

It will be obvious that I have provided a novel and very useful device for viewing with a single apparatus any desired type of print, with a maximum of convenience.

Manifestly, the construction herein shown is capable of considerable modification and such modifications as come within the scope of my claims, I consider within the spirit of my invention.

I claim:

1. An improvement in viewing apparatus comprising a casing, means mounted within and through said casing for supporting a print to be viewed, a first source of light mounted within the upper portion of said casing above said print supporting means, a concave mirror adjustably mounted in the lower portion of said casing below said print supporting means, said casing having an intermediate slanting portion with a sight opening formed therethrough, a second source of light mounted within said casing to one side of and above said concave mirror and below said sight opening, means for selectively energizing either of said sources of light and means having a single control member for adjusting said mirror to any desired position.

2. An improvement in viewing apparatus comprising a casing having an upper, intermediate and lower portion, a first source of light mounted within said upper portion, said upper portion having diametrically opposed slots formed through two sides thereof, means slidably mounted through said slots for supporting a print or prints to be viewed, said lower portion having a larger outside dimension than said upper portion, said intermediate portion having sides thereof slantingly positioned for joining said upper portion to said lower portion, one slanted side of said intermediate portion having a sight opening formed therethrough, a concave mirror adjustably mounted within said lower portion, a second source of light mounted within said lower portion to one side of and above said mirror and means for selectively energizing either of said sources of light.

3. An improvement in viewing apparatus comprising in combination a casing having a sight opening formed in one side thereof, means supported by said casing for supporting a print to be viewed, a first source of light mounted within and upon said casing on one side of said supporting means, a concave mirror element positioned on the side of said supporting means opposite said first source of light comprising a supporting frame adjustably mounted within and upon said casing, an apertured non-reflecting mat contained within said frame and a light reflecting concave mirror carried by said frame and having an area exposed through the aperture in said mat, a second source of light positioned on the mirror side of said supporting means, means for selectively energizing either of said sources of light and means for selectively orienting said mirror element relative to said sight opening and said print supporting means as desired.

4. An improvement in viewing apparatus comprising a casing, means slidably supported by said casing for supporting a print or prints to be viewed, a first source of light mounted within and upon said casing on one side of said sliding means, a concave mirror positioned on the side of said sliding means opposite said first source of light, a second source of light mounted upon and within said casing on the mirror side of said sliding means, means for selectively energizing said sources of light, means carried by said casing for pivotally supporting said mirror at a first point of said mirror, a handle rod attached to said mirror at a second point thereof diametrically opposite said first point, said casing being provided with an aperture through which said rod passes displaceably along the periphery of said casing, and a light shield carried by said rod and engaging said casing and closing said aperture therein for excluding light from the interior of said casing as said rod is displaced, and said casing being provided with a sight aperture positioned to receive a beam of light from said print reflected from said mirror.

5. An improvement in viewing apparatus comprising a casing, means slidably supported by said casing for supporting a print or prints to be viewed, a first source of light mounted within and upon said casing on one side of said sliding means, a concave mirror positioned on the side of said sliding means opposite said first source of light, a second source of light mounted upon and within said casing on the mirror side of said sliding means, means for selectively energizing said sources of light, means carried by said casing for pivotally supporting said mirror at a first point of said mirror, a handle rod attached to said mirror at a second point thereof diametrically opposite said first point, said casing being provided with a slot through which said rod passes, a slideway carried by said casing on the edges of said slot, an opaque slide carried by said rod and engageable in said slideway for excluding light from the interior of said casing as said rod is displaced, and said casing being provided with a sight aperture positioned to receive a beam of light from said print reflected from said mirror.

6. An improvement in viewing apparatus comprising a casing, means slidably supported by said casing for supporting a print or prints to be viewed, a first source of light mounted within and upon said casing on one side of said sliding means, a concave mirror positioned on the side of said sliding means opposite said first source of light, a second source of light mounted upon and within said casing on the mirror side of said sliding means, means for selectively energizing said sources of light, means carried by said casing for pivotally supporting said mirror at a first point of said mirror, a handle rod attached to said mirror at a second point thereof diametrically opposite said first point, said casing being provided with an approximately circular aperture relatively large with reference to the diameter of said rod and through which said rod passes, an approximately circular opaque shield carried by said rod and of larger diameter than said circular aperture for excluding light from the interior of said casing as said rod is displaced, said casing being provided with a viewing aperture positioned to receive a beam of light from said print reflected from said mirror.

ROBERT NEVILL ISBELL.